(12) United States Patent
Shmukler et al.

(10) Patent No.: US 12,199,560 B2
(45) Date of Patent: *Jan. 14, 2025

(54) BRACKET FOR CONNECTION OF A JUNCTION BOX TO PHOTOVOLTAIC PANELS

(71) Applicant: Solaredge Technologies Ltd., Herzeliya (IL)

(72) Inventors: Vadim Shmukler, Rishon-Lezion (IL); Lior Handelsman, Givatayim (IL); Nir Armony, Rishon-Lezion (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,263

(22) Filed: Oct. 11, 2023

(65) Prior Publication Data

US 2024/0154571 A1  May 9, 2024

Related U.S. Application Data

(63) Continuation of application No. 17/371,552, filed on Jul. 9, 2021, now Pat. No. 11,817,820, which is a
(Continued)

(51) Int. Cl.
*H02S 40/34* (2014.01)
*F16B 1/00* (2006.01)
(Continued)

(52) U.S. Cl.
CPC .............. *H02S 40/34* (2014.12); *F16B 1/00* (2013.01); *H02G 3/08* (2013.01); *H02S 20/00* (2013.01); *Y10T 29/49947* (2015.01)

(58) Field of Classification Search
USPC .................. 52/173.3; 248/237, 906; 126/623
See application file for complete search history.

(56) References Cited

U.S. PATENT DOCUMENTS 3,369,210 A   2/1968  Manickella
3,596,229 A   7/1971  Hohorst
(Continued)

FOREIGN PATENT DOCUMENTS

EP        420295 A1    4/1991
EP        604777 A1    7/1994
(Continued)

OTHER PUBLICATIONS

International Search Report for PCT/I82007/004610 dated Feb. 23, 2009.
(Continued)

*Primary Examiner* — Bradley Duckworth
(74) *Attorney, Agent, or Firm* — Banner & Witcoff, Ltd.

(57) ABSTRACT

A device for attaching a junction box to a photovoltaic. The photovoltaic panel has a photovoltaic side and a non-photovoltaic side. The device includes a bracket with a first side attachable to the junction box and a second side attachable to the non-photovoltaic surface of the photovoltaic panel. A central fastener is attachable at one end to the bracket and a plate is adapted for connecting to the other end of the central fastener and for mounting on the photovoltaic side of the photovoltaic panel. One or more rotatable spacers, connectible to the central fastener, may be located on the non-photovoltaic side of the photovoltaic panel. One or more fixed spacers may be located on the non-photovoltaic side connectible to the bracket.

18 Claims, 5 Drawing Sheets

Related U.S. Application Data continuation of application No. 16/806,017, filed on Mar. 2, 2020, now Pat. No. 11,088,656, which is a continuation of application No. 16/543,676, filed on Aug. 19, 2019, now Pat. No. 10,622,939, which is a continuation of application No. 16/114,701, filed on Aug. 28, 2018, now Pat. No. 10,432,138, which is a continuation of application No. 15/724,965, filed on Oct. 4, 2017, now Pat. No. 10,090,803, which is a continuation of application No. 15/231,218, filed on Aug. 8, 2016, now Pat. No. 9,813,020, which is a continuation of application No. 14/754,875, filed on Jun. 30, 2015, now Pat. No. 9,438,161, which is a continuation of application No. 14/183,566, filed on Feb. 19, 2014, now Pat. No. 9,099,849, which is a continuation of application No. 12/786,894, filed on May 25, 2010, now Pat. No. 8,690,110.

(60) Provisional application No. 61/180,912, filed on May 25, 2009.

(51) Int. Cl.
*H02G 3/08* (2006.01)
*H02S 20/00* (2014.01)

(56) References Cited

U.S. PATENT DOCUMENTS

| | | | |
|---|---|---|---|
| 4,150,660 A | 4/1979 | Peters et al. |
| 4,171,861 A | 10/1979 | Hohorst |
| 4,452,867 A | 6/1984 | Conforti |
| 4,460,232 A | 7/1984 | Sotolongo |
| 4,623,753 A | 11/1986 | Feldman et al. |
| 4,637,677 A | 1/1987 | Barkus |
| 4,641,079 A | 2/1987 | Kato et al. |
| 4,783,728 A | 11/1988 | Hoffman |
| 4,903,851 A | 2/1990 | Slough |
| 5,045,988 A | 9/1991 | Gritter et al. |
| 5,280,232 A | 1/1994 | Kohl et al. |
| 5,460,546 A | 10/1995 | Kunishi et al. |
| 5,497,289 A | 3/1996 | Sugishima et al. |
| 5,548,504 A | 8/1996 | Takehara |
| 5,604,430 A | 2/1997 | Decker et al. |
| 5,646,501 A | 7/1997 | Fishman et al. |
| 5,773,963 A | 6/1998 | Blanc et al. |
| 5,798,631 A | 8/1998 | Spee et al. |
| 5,801,519 A | 9/1998 | Midya et al. |
| 5,804,894 A | 9/1998 | Leeson et al. |
| 5,821,734 A | 10/1998 | Faulk |
| 5,822,186 A | 10/1998 | Bull et al. |
| 5,838,148 A | 11/1998 | Kurokami et al. |
| 5,869,956 A | 2/1999 | Nagao et al. |
| 5,870,092 A | 2/1999 | Bedford-Roberts |
| 5,873,738 A | 2/1999 | Shimada et al. |
| 5,892,354 A | 4/1999 | Nagao et al. |
| 5,923,158 A | 7/1999 | Kurokami et al. |
| 5,933,327 A | 8/1999 | Leighton et al. |
| 5,945,806 A | 8/1999 | Faulk |
| 5,963,010 A | 10/1999 | Hayashi et al. |
| 5,990,659 A | 11/1999 | Frannhagen |
| 6,031,736 A | 2/2000 | Takehara et al. |
| 6,038,148 A | 3/2000 | Farrington et al. |
| 6,046,919 A | 4/2000 | Madenokouji et al. |
| 6,050,779 A | 4/2000 | Nagao et al. |
| 6,082,122 A | 7/2000 | Madenokouji et al. |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,145,264 A | 11/2000 | Dallaire |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,259,234 B1 | 7/2001 | Perol |
| 6,262,558 B1 | 7/2001 | Weinberg |
| 6,285,572 B1 | 9/2001 | Onizuka et al. |
| 6,320,769 B2 | 11/2001 | Kurokami et al. |
| 6,339,538 B1 | 1/2002 | Handleman |
| 6,493,246 B2 | 12/2002 | Suzui et al. |
| 6,531,848 B1 | 3/2003 | Chitsazan et al. |
| 6,545,211 B1 | 4/2003 | Mimura |
| 6,548,205 B2 | 4/2003 | Leung et al. |
| 6,590,793 B1 | 7/2003 | Nagao et al. |
| 6,608,468 B2 | 8/2003 | Nagase |
| 6,611,441 B2 | 8/2003 | Kurokami et al. |
| 6,672,018 B2 | 1/2004 | Shingleton |
| 6,678,174 B2 | 1/2004 | Suzui et al. |
| 6,690,590 B2 | 2/2004 | Stamenic et al. |
| 6,738,692 B2 | 5/2004 | Schienbein et al. |
| 6,768,047 B2 | 7/2004 | Chang et al. |
| 6,788,033 B2 | 9/2004 | Vinciarelli |
| 6,795,318 B2 | 9/2004 | Haas et al. |
| 6,801,442 B2 | 10/2004 | Suzui et al. |
| 6,914,418 B2 | 7/2005 | Sung |
| 6,919,714 B2 | 7/2005 | Delepaut |
| 6,936,995 B2 | 8/2005 | Kapsokavathis et al. |
| 6,963,147 B2 | 11/2005 | Kurokami et al. |
| 6,984,970 B2 | 1/2006 | Capel |
| 7,030,597 B2 | 4/2006 | Bruno et al. |
| 7,031,176 B2 | 4/2006 | Kotsopoulos et al. |
| 7,042,195 B2 | 5/2006 | Tsunetsugu et al. |
| 7,046,531 B2 | 5/2006 | Zocchi et al. |
| 7,053,506 B2 | 5/2006 | Alonso et al. |
| 7,072,194 B2 | 7/2006 | Nayar et al. |
| 7,079,406 B2 | 7/2006 | Kurokami et al. |
| 7,087,332 B2 | 8/2006 | Harris |
| 7,090,509 B1 | 8/2006 | Gilliland et al. |
| 7,091,707 B2 | 8/2006 | Cutler |
| 7,097,516 B2 | 8/2006 | Werner et al. |
| 7,126,053 B2 | 10/2006 | Kurokami et al. |
| 7,126,294 B2 | 10/2006 | Minami et al. |
| 7,148,669 B2 | 12/2006 | Maksimovic et al. |
| 7,291,036 B1 | 11/2007 | Daily et al. |
| 7,385,833 B2 | 6/2008 | Keung |
| 7,420,815 B2 | 9/2008 | Love |
| 7,435,134 B2 | 10/2008 | Lenox |
| 7,435,897 B2 | 10/2008 | Russell |
| 7,600,349 B2 | 10/2009 | Liebendorfer |
| 7,658,356 B1 | 2/2010 | Nehls |
| 7,748,175 B2 | 7/2010 | Liebendorfer |
| 7,758,011 B2 | 7/2010 | Haddock |
| 7,759,575 B2 | 7/2010 | Jones et al. |
| 7,763,807 B2 | 7/2010 | Richter |
| 7,780,472 B2 | 8/2010 | Lenox |
| 7,956,280 B2 | 6/2011 | Kobayashi |
| 7,960,650 B2 | 6/2011 | Richter et al. |
| 7,987,360 B2 | 7/2011 | Luo et al. |
| 8,003,885 B2 | 8/2011 | Richter et al. |
| 8,156,697 B2 | 4/2012 | Miros et al. |
| 8,181,402 B2 | 5/2012 | Tsuzuki et al. |
| 8,191,321 B2 | 6/2012 | McClellan et al. |
| 8,266,848 B2 | 9/2012 | Miros et al. |
| 8,500,462 B2 | 8/2013 | Mills et al. |
| 8,512,050 B2 | 8/2013 | McGreevy et al. |
| 8,690,110 B2 | 4/2014 | Shmukler et al. |
| 9,099,849 B2 | 8/2015 | Shmukler et al. |
| 9,438,161 B2 | 9/2016 | Shmukler et al. |
| 9,813,020 B2 | 11/2017 | Shmukler et al. |
| 10,090,803 B2 | 10/2018 | Shmukler et al. |
| 10,432,138 B2 | 10/2019 | Shmukler et al. |
| 10,622,939 B2 | 4/2020 | Shmukler et al. |
| 11,088,656 B2 | 8/2021 | Shmukler et al. |
| 11,817,820 B2 * | 11/2023 | Shmukler ............... H02S 20/00 |
| 2003/0080741 A1 | 5/2003 | LeRow et al. |
| 2004/0201279 A1 | 10/2004 | Templeton |
| 2005/0057214 A1 | 3/2005 | Matan |
| 2005/0057215 A1 | 3/2005 | Matan |
| 2005/0068820 A1 | 3/2005 | Radosevich et al. |
| 2005/0172995 A1 | 8/2005 | Rohrig et al. |
| 2006/0001406 A1 | 1/2006 | Matan |
| 2006/0038692 A1 | 2/2006 | Schnetker |

(56) References Cited

U.S. PATENT DOCUMENTS

| | | |
|---|---|---|
| 2006/0108979 A1 | 5/2006 | Daniel et al. |
| 2006/0149396 A1 | 7/2006 | Templeton |
| 2006/0162772 A1 | 7/2006 | Presher et al. |
| 2006/0174939 A1 | 8/2006 | Matan |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2007/0044837 A1 | 3/2007 | Simburger et al. |
| 2007/0147075 A1 | 6/2007 | Bang |
| 2007/0159866 A1 | 7/2007 | Siri |
| 2008/0080177 A1 | 4/2008 | Chang |
| 2008/0097655 A1 | 4/2008 | Hadar et al. |
| 2008/0136367 A1 | 6/2008 | Adest et al. |
| 2008/0144294 A1 | 6/2008 | Adest et al. |
| 2008/0238195 A1 | 10/2008 | Shaver et al. |
| 2008/0296460 A1 | 12/2008 | Kerr, Jr. |
| 2009/0078299 A1 | 3/2009 | Cinnamon et al. |
| 2009/0084570 A1 | 4/2009 | Gherardini et al. |
| 2009/0250580 A1 | 10/2009 | Strizki |
| 2009/0282755 A1 | 11/2009 | Abbott et al. |
| 2010/0263297 A1 | 10/2010 | Liebendorfer |
| 2010/0269430 A1 | 10/2010 | Haddock |
| 2010/0282290 A1 | 11/2010 | Schwarze et al. |
| 2010/0293729 A1 | 11/2010 | Lee |
| 2010/0294528 A1 | 11/2010 | Sella et al. |
| 2010/0297860 A1 | 11/2010 | Shmukler et al. |
| 2011/0047903 A1 | 3/2011 | Kobayashi |
| 2011/0114149 A1 | 5/2011 | Li |
| 2011/0114154 A1 | 5/2011 | Lichy et al. |
| 2011/0168227 A1 | 7/2011 | Carriere |
| 2011/0168228 A1 | 7/2011 | McGreevy et al. |
| 2011/0203637 A1 | 8/2011 | Patton et al. |
| 2011/0214368 A1 | 9/2011 | Haddock et al. |
| 2011/0260027 A1 | 10/2011 | Farnham, Jr. |
| 2011/0271611 A1 | 11/2011 | Maracci et al. |
| 2011/0283635 A1 | 11/2011 | Sato et al. |
| 2011/0302859 A1 | 12/2011 | Crasnianski |
| 2012/0023842 A1 | 2/2012 | Wang et al. |
| 2012/0030919 A1 | 2/2012 | Roger et al. |
| 2012/0060919 A1 | 3/2012 | Mills et al. |

FOREIGN PATENT DOCUMENTS

| | | |
|---|---|---|
| EP | 1531545 A2 | 5/2005 |
| EP | 1657797 A1 | 5/2006 |
| ES | 2249147 A1 | 3/2006 |
| JP | 2003134667 A | 5/2003 |
| JP | 2007058845 A | 3/2007 |
| WO | 1993013587 A1 | 7/1993 |
| WO | 1996013093 A1 | 5/1996 |
| WO | 1998023021 A2 | 5/1998 |
| WO | 2003050938 A2 | 6/2003 |
| WO | 2003071655 A1 | 8/2003 |
| WO | 2004023278 A2 | 3/2004 |
| WO | 2004090993 A2 | 10/2004 |
| WO | 2004107543 A2 | 12/2004 |
| WO | 2005076445 A1 | 8/2005 |
| WO | 2006078685 A2 | 7/2006 |
| WO | 2007006564 A2 | 1/2007 |
| WO | 2007084196 A2 | 7/2007 |
| WO | 2007113358 A1 | 10/2007 |

OTHER PUBLICATIONS

International Search Report for PCT/I82007/004584 dated Jan. 28, 2009.
International Search Report for PCT/I82007/004586 dated Mar. 5, 2009.
International Search Report for PCT/I82007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Fa9ade with 100 WAC Photovoltaic Modules", 1996 IEEE, 25th PVSC, May 13-17, 1996, pp. 1235-1238, Washington, DC.
Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Lindgren, "Topology for Decentralised Solar Energy Inverters with a Low Voltage AC-Bus", Chalmers University of Technology, Department of Electrical Power Engineering, EPE '99—Lausanne.
Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.
Palma. "A Modular Fuel Cell. Modular DC-DC Converter Concept for High Performance and Enhanced Reliability", IEEE 2007, pp. 2633-2638.
Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 2oth European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
PCT/IB2010/052287 International Search Report and Written Opinion dated Sep. 2, 2010.

* cited by examiner

41 Attach bracket to the junction box and to the non-photovoltaic side

43 Attach a central fastener to bracket

45 Connect a plate to the other end of central fastener, on the photovoltaic side

BRACKET FOR CONNECTION OF A JUNCTION BOX TO PHOTOVOLTAIC PANELS

CROSS-REFERENCE TO RELATED APPLICATIONS

This application is a continuation of U.S. patent application Ser. No. 17/371,552, filed Jul. 9, 2021, which is a continuation of U.S. patent application Ser. No. 16/806,017, filed Mar. 2, 2020, now U.S. Pat. No. 11,088,656, which is a continuation of U.S. patent application Ser. No. 16/543,676, filed Aug. 19, 2019, now U.S. Pat. No. 10,622,939, which is a continuation of U.S. patent application Ser. No. 16/114,701, filed Aug. 28, 2018, now U.S. Pat. No. 10,432,138, which is a continuation of U.S. patent application Ser. No. 15/724,965, filed Oct. 4, 2017, now U.S. Pat. No. 10,090,803, which is a continuation of U.S. patent application Ser. No. 15/231,218, filed Aug. 8, 2016, now U.S. Pat. No. 9,813,020, which is a continuation of U.S. patent application Ser. No. 14/754,875, filed Jun. 30, 2015, now U.S. Pat. No. 9,438,161, which is a continuation of U.S. patent application Ser. No. 14/183,566, filed Feb. 19, 2014, now U.S. Pat. No. 9,099,849, which is a continuation of U.S. patent application Ser. No. 12/786,894, filed May 25, 2010, now U.S. Pat. No. 8,690,110, which claims benefit from U.S. patent application 61/180,912 filed May 25, 2009, the disclosures of which are incorporated herein by reference.

BACKGROUND

1. Technical Field

The present invention relates to attaching junction boxes to photovoltaic panels and specifically to a bracket for attaching junction boxes to photovoltaic panels.

2. Description of Related Art

A photovoltaic module or photovoltaic panel is a packaged interconnected assembly of photovoltaic cells, also known as solar cells. Since a single photovoltaic module can only produce a limited amount of power, commercial installations include several modules or panels interconnected in serial and in parallel into a photovoltaic array. Electrical connections are made in series to achieve a desired output voltage and/or in parallel to provide a desired amount of current source capability. A photovoltaic installation typically includes the array of photovoltaic modules, an inverter, batteries and interconnection wiring. Electronic modules may be integrated with the photovoltaic modules which perform electrical conversion, e.g. direct current (DC) to direct current conversion, electrical inversion, e.g. micro-inverter, or other functions such as monitoring of performance and/or protection against theft.

An approach for mounting photovoltaic modules on the roofs of buildings is disclosed in U.S. Pat. No. 7,435,897, which discloses attaching a junction box to a bracket as part of a photovoltaic installation.

The term "cable gland" as used herein refers to a device used for the entry of electrical cables or cords into electrical equipment and is used to firmly secure an electrical cable entering a piece of electrical equipment.

The terms "bracket," "mount," and "bracket mount" are used herein interchangeably.

BRIEF SUMMARY

According to an aspect of the present invention there is provided a device for attaching a junction box to a photovoltaic panel, the photovoltaic panel having a photovoltaic side and a non-photovoltaic side. The device includes a bracket with a first side attachable to the junction box and a second side attachable to the non-photovoltaic surface of the photovoltaic panel. A central fastener is attachable at one end to the bracket and a plate is adapted for connecting to the other end of the central fastener and for mounting on the photovoltaic panel or frame typically on the photovoltaic side of the panel. One or more rotatable spacers, connectible to the central fastener, may be located on the non-photovoltaic side of the photovoltaic panel. One or more fixed spacers may be located on the non-photovoltaic side connectible to the bracket.

The bracket may attach to respective non-photovoltaic sides of two adjacent photovoltaic panels and the central fastener extends between respective edges of the two adjacent photovoltaic panels. The two adjacent panels are electrically connectible within the junction box. The bracket may also attach to respective non-photovoltaic sides of four adjacent photovoltaic panels, with the central fastener extending between respective corners of the four adjacent photovoltaic panels. The four adjacent panels are typically connected electrically within the junction box.

According to another aspect of the present invention, there is provided a method for attaching a junction box to one or more photovoltaic panels. The photovoltaic panel has a photovoltaic side and a non-photovoltaic side. A first side of a bracket is attached to the junction box and a second side of the bracket is attached to the non-photovoltaic side. A central fastener is attached at one end to the bracket. A plate usually rotatable is connected to the other end of the central fastener and mounted on the photovoltaic side of the photovoltaic panel. One or more spacers are optionally rotatable and connected on the non-photovoltaic side to the central fastener. The bracket may be attached to non-photovoltaic sides of two adjacent photovoltaic panels and the central fastener extends between respective edges of two adjacent photovoltaic panels. The two adjacent photovoltaic panels may be electrically connected within the junction box. Alternatively, the bracket is attached to non-photovoltaic sides of four adjacent photovoltaic panels, and the central fastener extends between respective corners of the four adjacent photovoltaic panels. The four adjacent photovoltaic panels may be connected within the junction box.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1A:
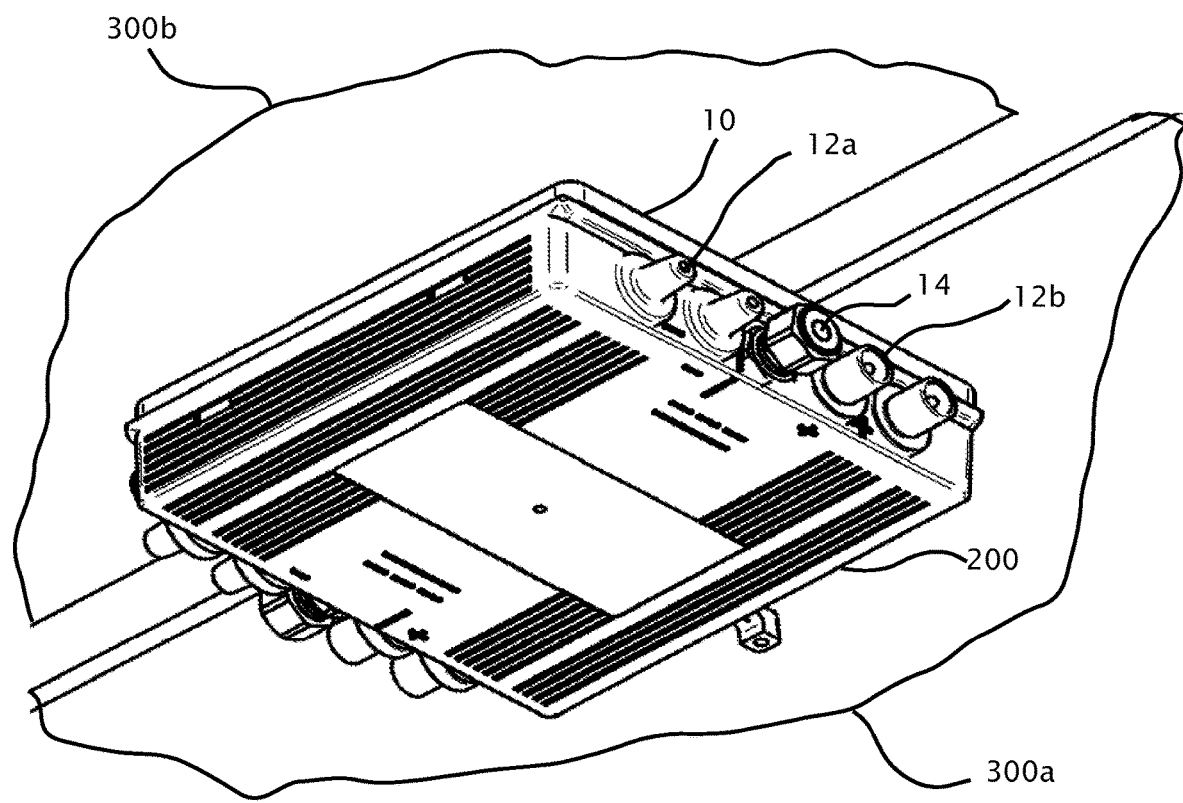
FIG. 1a shows a junction box mechanically attached to two photovoltaic panels by a bracket according to an aspect of the present invention.

The foregoing and/or other aspects will become apparent from the following detailed description when considered in conjunction with the accompanying drawing figures.

DETAILED DESCRIPTION

Reference will now be made in detail to embodiments of the present invention, examples of which are illustrated in the accompanying drawings, wherein like reference numerals refer to the like elements throughout. The aspects are described below to explain the present invention by referring to the figures.

Before explaining aspects of the invention m detail, it is to be understood that the invention is not limited in its application to the details of design and the arrangement of the components set forth in the following description or illustrated in the drawings. The invention is capable of other aspects or of being practiced or carried out in various ways. Also, it is to be understood that the phraseology and terminology employed herein is for the purpose of description and should not be regarded as limiting.

Reference is now made to FIG. 1a which shows a junction box 200 mechanically attached to two photovoltaic panels 300b and 300a respectively by a bracket 10 according to an aspect of the present invention. Junction box 200 is typically mounted on the non-photovoltaic sides of panels 300a and 300b. Junction box 200 may typically contain a circuit board and connection terminals which are both used to terminate cables entering and leaving junction box 200 using cable glands 14, male socket connectors 12a and female socket connectors 12b. Junction box 200 typically provides a way for connecting panels 300a and 300b electrically together. The junction box may be passive including connector and wires, and possibly passive elements such as diodes, or active—e.g. containing a circuit board inside that implements a direct current (DC) to alternating current (AC) inverter or a DC to DC converter. Junction box 200 is attached to a bracket or mount 10 and bracket 10 is used to attach junction box 200 to photovoltaic panels 300a and 300b.

Figure 1B:
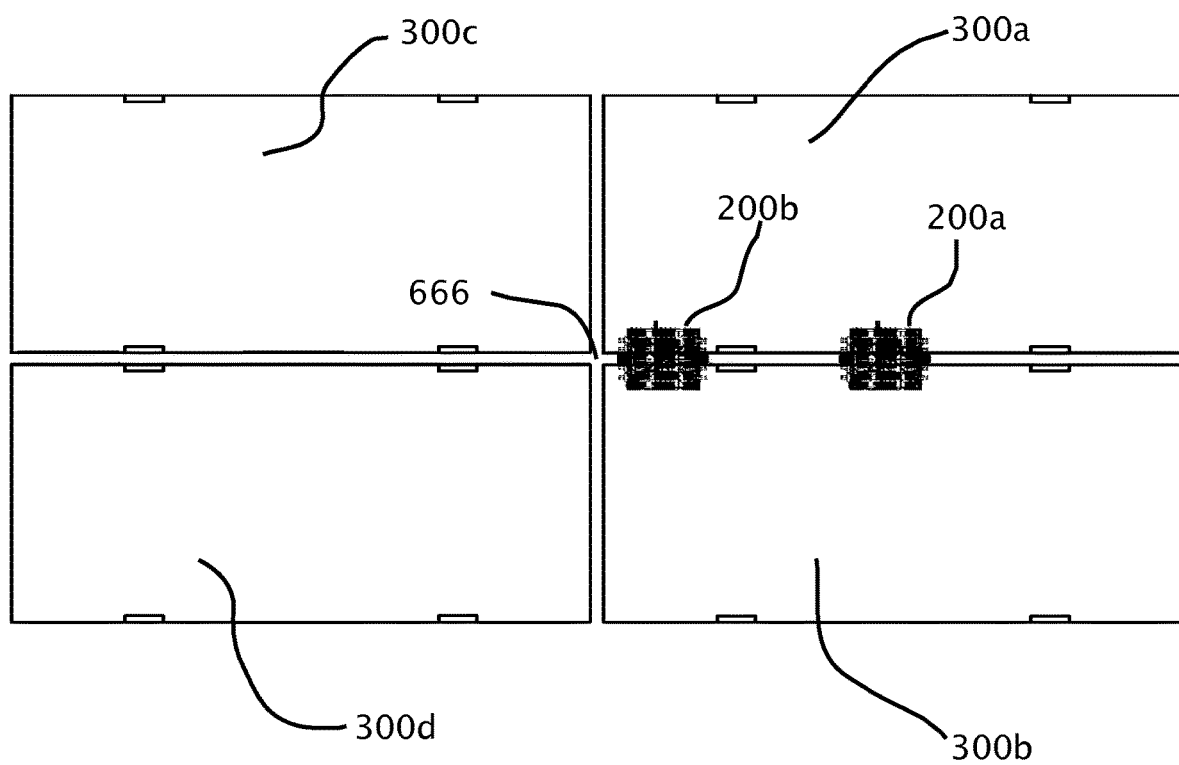
FIG. 1b shows two junction boxes, which may be mounted (using a bracket) in various positions on multiple panels, according to an aspect of the present invention.

Reference is now made to FIG. 1b which shows junction boxes 200a and 200b, which may be mounted (using bracket 10) in various positions on multiple panels 300a, 300b, 300c or 300d, according to an aspect of the present invention. Junction box 200a may be used to connect panels 300a and 300b electrically together. Alternatively, junction box 200b shown located near cross point 666 or at cross point 666 of panels 300 may be used to connect panels 300a, 300b, 300c or 300d electrically together.

Figure 1C:
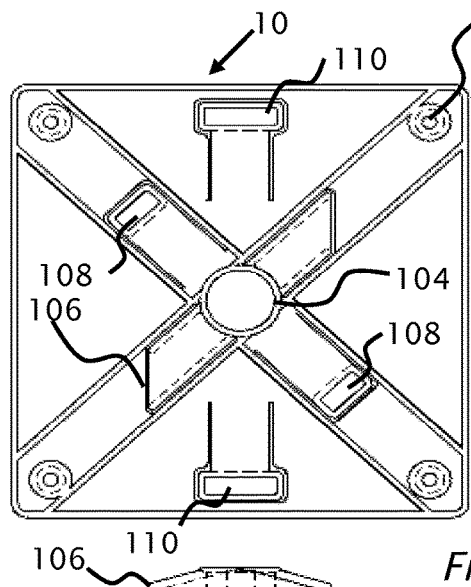
FIG. 1c shows a topside plan view of a bracket mount according to an aspect of the present invention.
Figure 1F:
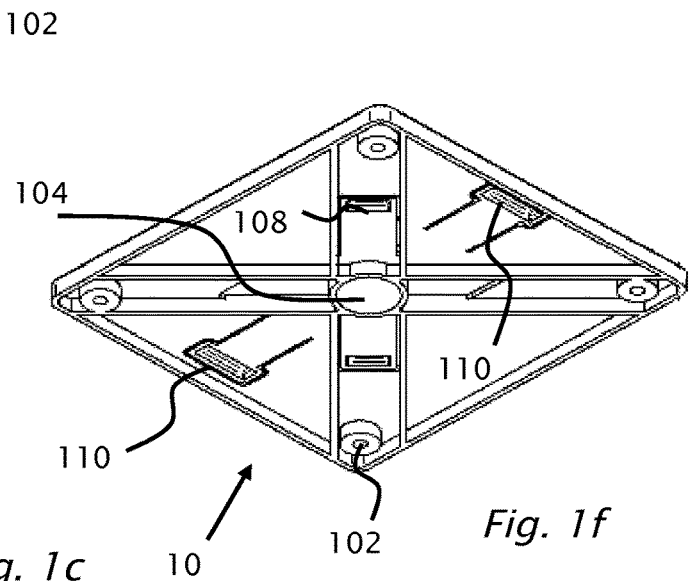
FIG. 1f shows an isometric view looking at the topside of a bracket mount according to an aspect of the present invention.
Figure 1D:
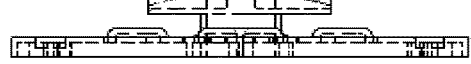
FIG. 1d shows a side view of a bracket mount according to an aspect of the present invention.
Figure 1E:
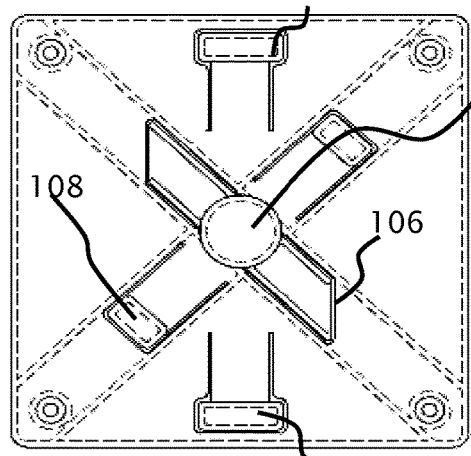
FIG. 1e shows a bottom side plan view of a bracket mount according to an aspect of the present invention.

Reference is now made to FIGS. 1c, 1d and 1e which show top side plan view, a side view and a bottom side plan view respectively of a bracket mount 10 according to an aspect of the present invention. Bracket mount 10 has a four mounting holes 102 used to secure bracket mount 10 to junction box 200. Bracket 10 also has two fixed positioned spacers 110 which are preferably spring loaded and two adjustable position spacers 108 which are also preferably spring loaded. Plate 106 swivels around a central pillar 104 such that plate 106 is parallel to the X Y plane shown in FIG. 1e.

Figure 1G:
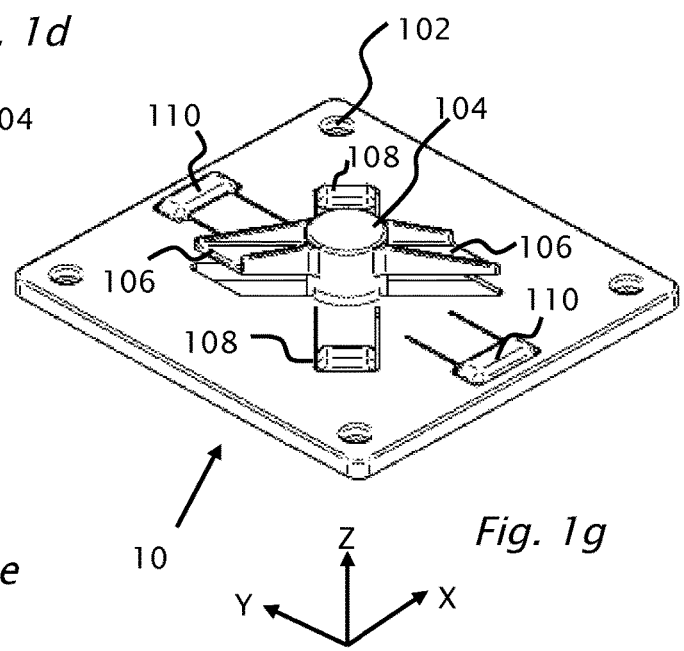
FIG. 1g shows an isometric view looking at the bottom side of a bracket mount according to an aspect of the present invention.

Reference is now made to FIG. 1f and 1g which show an isometric views looking at the topside and bottom side of bracket 10 according to an aspect of the present invention. FIG. 1f and 1g show the four mounting holes 102, two fixed positioned spacers 110, the two adjustable position spacers 108, plate 106 and central pillar 104.

Figures 2A, 2B, 4:
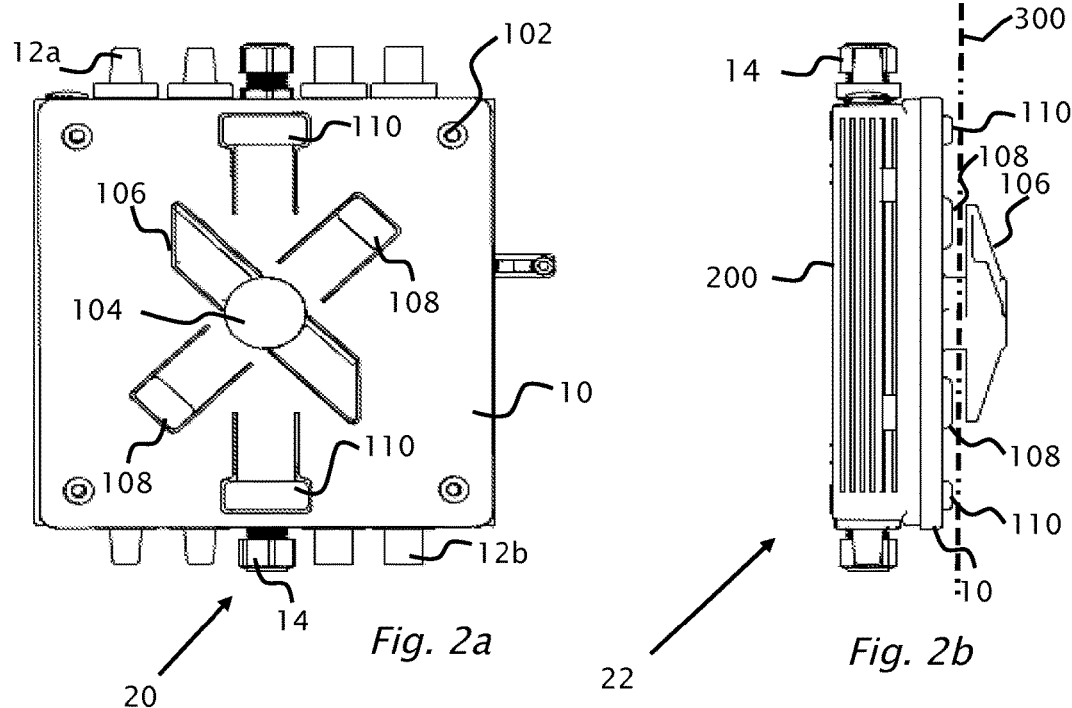
FIG. 2a shows a topside plan view of a bracket mount mounted to a junction box according to an aspect of the present invention.
FIG. 2b shows a side view of a bracket mount mounted to a junction box according to an aspect of the present invention.
FIG. 4 shows a flow diagram illustrating a method according to features of the present invention for attaching a junction box to one or more photovoltaic panels.

Reference is now made to FIGS. 2a and 2b which show a plan view 20 and side view 22 of bracket mount 10 attached to junction box 200 via four mounting holes 102 according to an aspect of the present invention. FIGS. 2a and 2b show the two fixed positioned spacers 110, the two adjustable position spacers 108, plate 106, central pillar 104, bracket mount 10 and junction box 200 along with cable glands 14, male socket connectors 12a and female socket connectors 12b.

Figures 3A, 3B:
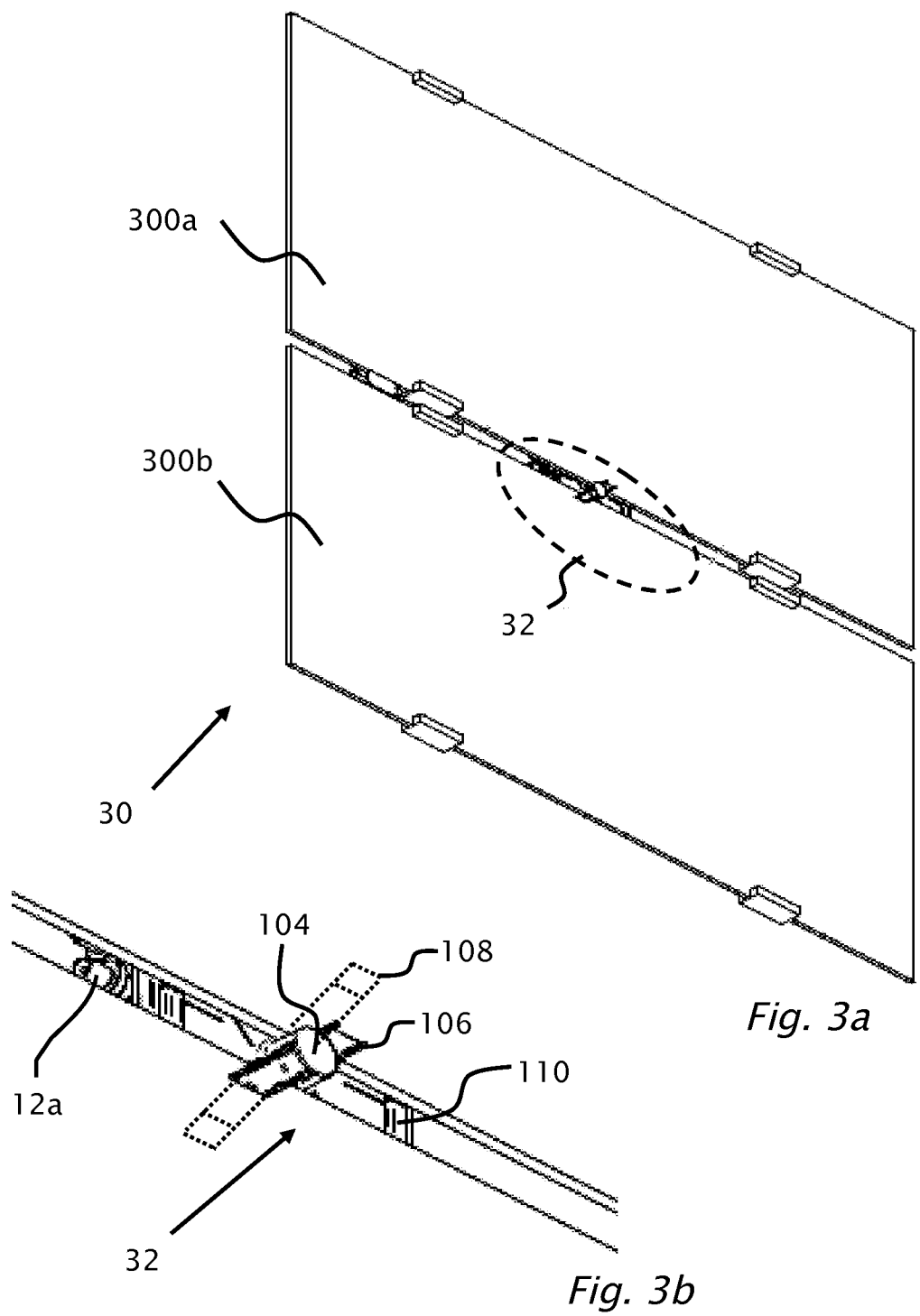
FIG. 3a shows the photovoltaic side of two solar panels with a bracket mount and a junction box attached in between the two solar panels according to an aspect of the present invention.
FIG. 3b shows further details of a bracket mount and a junction box attached in between two solar panels according to an aspect of the present invention.

Reference is now made to FIGS. 3a and 3b which show an isometric view 30 and isometric view of area 32 respectively according to an aspect of the present invention. FIG. 3a shows the photovoltaic side of two solar panels 300a and 300b with bracket mount 10 (attached to junction box 200) attached in between two solar panels 300a and 300b (shown by area 32). FIG. 3b shows further details of the isometric view of area 32. With bracket mount 10 attached to junction box 200, bracket mount 10 and junction box 200 are located on the non-photovoltaic side of solar panels 300a and 300b. Central pillar 104 protrudes between solar panels 300a and 300b with plate 106 twisted around central pillar 104 so that plate 106 is in contact with the photovoltaic side of panels 300a and 300b. The two fixed positioned spring loaded spacers 110 and the two adjustable spring loaded position spacers 108 (shown with a dotted line) allow bracket 10 (attached to junction box 200) to clamp onto panels 300a and 300b. Through a gap between panels 300a and 300b can be seen fixed positioned spacers 110 and a male socket connector 12a.

Reference is now also made to FIG. 4, a flow diagram illustrating a method according to features of the present invention for attaching junction box 200 to one or more photovoltaic panels 300. A first side of bracket 10 is attached (step 41) to junction box 200 and a second side of bracket 10 is attached (step 41) to the non-photovoltaic side. A central fastener 104 is attached (step 43) at one end to bracket 10. Bracket 10 may be previously assembled with the fastener 104, and the installer only mounts the junction box 200 to bracket 10, and then mount bracket 10 to panel 300 Plate 106 is rotatably connected (step 45) to the other end of the central fastener 104 and mounted on the photovoltaic side of photovoltaic panel 300. One or more rotatable spacers 108 are connected on the non-photovoltaic side to the central fastener. Bracket 10 may be attached to non-photovoltaic sides of two adjacent photovoltaic panels 300 and central fastener 104 extends between respective edges of two adjacent photovoltaic panels 300. The two adjacent photovoltaic panels 300 may be electrically connected within junction box 200. Alternatively, bracket 10 is attached to non-photovoltaic sides of four adjacent photovoltaic panels 300, and central fastener 104 extends between respective corners of the four adjacent photovoltaic panels 300. The four adjacent photovoltaic panels 300 may be connected within junction box 200.

The definite articles "a", "an" is used herein, such as "a bracket", "a junction box" have the meaning of "one or more" that is "one or more brackets" or "one or junction boxes".

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined. Also although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

The invention claimed is:

1. An apparatus comprising:
   a junction box;
   a fastener; and
   a bracket;
   wherein the bracket is configured to mount the junction box, and wherein the junction box is configured to electrically connect at least two photovoltaic panels; and
   wherein the bracket and fastener are configured for clamping an edge or a frame of the at least two photovoltaic panels.

2. The apparatus of claim 1, wherein the fastener comprises a plate, and wherein the plate is configured to clamp the bracket to the at least two photovoltaic panels.

3. The apparatus of claim 2, wherein the plate is configured to rotate relative to the bracket.

4. The apparatus of claim 1, wherein the junction box comprises a plurality of connectors configured to connect a plurality of leads of the at least two photovoltaic panels.

5. The apparatus of claim 1, wherein the junction box comprises a circuit board configured to implement a direct current (DC) to alternating current (AC) inverter or a DC to DC converter.

6. The apparatus of claim 1, wherein the junction box comprises cables and cable glands for electrically connecting the junction box to a plurality of junction boxes.

7. The apparatus of claim 1, comprising a spacer configured for mounting between the bracket and the at least two photovoltaic panels.

8. A system comprising:
   at least two photovoltaic panels;
   a mounting apparatus comprising:
      a junction box;
      a fastener; and
      a bracket;
      wherein the bracket is configured to mount the junction box,
      wherein the bracket and fastener are configured to clamp an edge or a frame of the at least two photovoltaic panels; and
      wherein the junction box is configured to electrically connect the at least two photovoltaic panels.

9. The system of claim 8, wherein the junction box comprises a plurality of connectors configured to connect a plurality of leads of the at least two photovoltaic panels.

10. The system of claim 8, wherein the junction box comprises cables and cable glands for electrically connecting the junction box to a plurality of junction boxes.

11. The system of claim 8, wherein the fastener and the bracket are configured to clamp therebetween at least four photovoltaic panels, wherein the at least four photovoltaic panels comprise the at least two photovoltaic panels.

12. The system of claim 8, wherein the at least two photovoltaic panels are adjacent.

13. The system of claim 8, wherein the junction box comprises a circuit board configured to implement a direct current (DC) to alternating current (AC) inverter or a DC to DC converter.

14. The system of claim 8, comprising a plurality of mounting apparatuses connected in series to produce an output voltage.

15. The system of claim 8, comprising a plurality of mounting apparatuses connected in parallel to produce an output current.

16. The system of claim 8, comprising an installation DC to AC inverter and a plurality of mounting apparatuses connected in series.

17. The system of claim 8, wherein the junction box comprises a circuit board configured for monitoring of performance of the at least two photovoltaic panels.

18. The system of claim 8, wherein the junction box comprises a circuit board configured to protect against theft of the at least two photovoltaic panels.

* * * * *